United States Patent Office 3,168,929
Patented Feb. 9, 1965

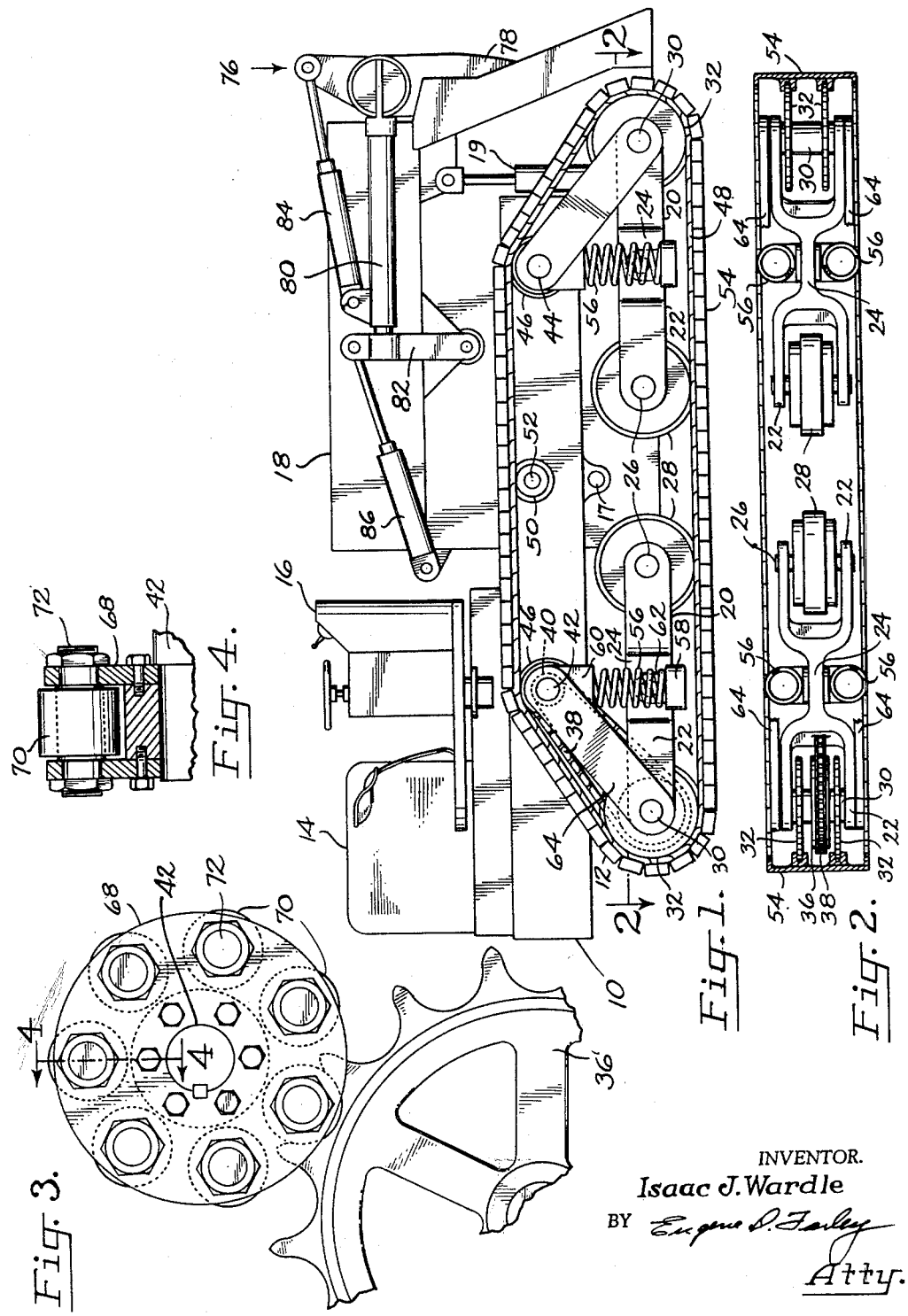

3,168,929
DRIVE SUSPENSION FOR A TRACK
LAYING VEHICLE
Isaac J. Wardle, Pierce Park Lane, Rte. 3, Boise, Idaho
Original application Nov. 7, 1958, Ser. No. 772,528, now Patent No. 3,094,794, dated June 25, 1963. Divided and this application Nov. 13, 1962, Ser. No. 237,402
1 Claim. (Cl. 180—9.54)

This invention relates to a self-loading, carry-all vehicle which may be used for digging, scraping, loading, hauling, dumping, and spreading operations such as in grading work or for handling bulk material such as sand, gravel, or agricultural products and like materials.

This application is a division of Serial No. 772,528, filed November 7, 1958, now Patent No. 3,094,794.

An object of the present invention is to provide a vehicle of the type described employing improved means for supporting and propelling the vehicle whereby the vehicle is capable of operating on rough terrain while maintaining maximum traction engagement with the terrain and maintaining its load handling box in a plane substantially parallel to the overall plane of the terrain.

Another object is to provide a carry-all vehicle employing propelling means capable of moving the vehicle at a relatively high rate of speed as compared with conventional vehicles of this type.

A further object is to provide a carry-all vehicle which employs resilient support means intermediate the chassis and track laying support and propelling means.

Another object is to provide improved sprocket drive means for a track laying vehicle.

The manner in which the foregoing and other objects of this invention are accomplished will be apparent from the accompanying specification and claim considered together with the drawings wherein like numerals of reference indicate like parts and wherein:

FIG. 1 is a side elevational view of a self-loading carry-all vehicle utilizing improved means for supporting and propelling the vehicle;

FIG. 2 is a longitudinal sectional view of the supporting and propelling means, taken on the line 2—2 of FIG. 1;

FIG. 3 is an alternative form of drive means for the supporting and propelling means; and FIG. 4 is a sectional view taken on the line 4—4 of FIG. 3.

Referring first to FIGS. 1 and 2, a carry-all vehicle of the present invention comprises in general a chassis or frame 10 supported on a pair of side track assemblies 12. The chassis 10 supports a power unit 14, an operator's control panel 16, and a receptacle or loading box 18 open at the front and top.

Box 18 is pivotally mounted on the chassis adjacent the rear thereof by shaft 17 and the front end of the box is supported on piston rods of fluid cylinders 19 mounted on the chassis at opposite sides of the box. The front end of the loading box may thereby be lowered to ground level if desired for scraping operations or for picking up material. Box 18 has ejecting means, not shown, which may comprise ram means movable longitudinally within the box.

Each of the track assemblies 12 comprises a pair of truck members 20, and as best seen in FIG. 2 these truck members have oppositely extending fork portions 22 connected together by a body portion 24. Rotatably mounted on a shaft 26 supported between one of the forked portions of each truck member is a free running wheel 28, and disposed at the opposite end of each truck is a shaft 30. The shaft 30 of the truck adjacent the rear of the vehicle is a driven shaft while the shaft 30 of the truck at the front of the vehicle is not driven. Each of the shafts 30 carries a pair of sprockets 32, the sprockets 32 on the one shaft 30 being driven sprockets and the sprockets on the other shaft 30 being idler sprockets.

Keyed to the driven shaft 30 is a sprocket 36 which meshes with a drive chain 38 also disposed in meshing relation with a drive sprocket 40 keyed to drive shaft 42. Shaft 42 is operated in forward or reverse directions by the power unit 14, and while this shaft is designated herein as the sole driving means for a track assembly it is to be understood that a shaft 44 similarly positioned at the opposite end of the track assembly may also comprise a drive shaft. Pairs of idler sprockets 46 are mounted on the shafts 42 and 44 for meshing engagement with an endless chain 48 also meshing with an upper idler sprocket 50 rotatable on a shaft 52 and the end sprockets 32. Endless chains 48 are connected to and carry therewith an endless ground engaging track member 54.

The vehicle is resiliently supported on the track assemblies by pairs of heavy coil springs 56 supported on bases 58 mounted on the trucks 20. The upper ends of these springs engage block members 60 pivotally mounted on the shafts 42 and 44. Lower bases 58 are pivotally mounted on the body portion 24 of the trucks 20 by pins 62. It is to be understood of course that other suitable resilient support means may be used in lieu of the springs 56 such as inflatable cushion means.

Shafts 42 and 44 are connected to their respective lower shafts 30 by pairs of radius arms or end links 64. Arms 64 are inclined upwardly in convergent relation. By such mounting arrangement it will be seen that the chassis is resiliently supported on the track assemblies and the linkage used therewith permits maximum traction in that if the vehicle is negotiating rough terrain the tracks are capable of contouring themselves to the terrain. For example, if the front portion of one of the track assemblies encounters a depression, the radius arms 64 associated with the truck at this end swing down to permit the front end of such truck to fall and follow the contour of the terrain. If encountering an obstacle the front end of the truck will rise. As the radius arms maintain the same distance between the shafts 42, 44 and their respective shafts 30, there will be a constant tension maintained on the track 54 at all times. This structure provides maximum traction for the tracks and also it will be apparent that the vehicle chassis will be maintained substantially parallel with the general or overall grade. The chain drive also provides a suitable predetermined drive ratio which permits operation of the vehicle at high rates of speeds as far as this type of vehicle is concerned.

Referring to FIGS. 3 and 4 there is shown an alternative form of drive means for the track assemblies 12. In this arrangement a pinion wheel 68 is keyed to the drive shaft 42 and is disposed in meshing relationship with the lower sprocket 36 for operating shaft 32. Wheel 68 carries a plurality of steel sleeves 70 rotatably mounted on shafts 72 and engageable with teeth of sprocket 36.

It is to be understood that the forms of my invention herein shown and described are to be taken as preferred examples of the same and that various changes in the shape, size and arrangement of parts may be resorted to without departing from the spirit of my invention or the scope of the subjoined claim.

Having thus described my invention, I claim:
A carry-all vehicle comprising:
(a) an elongated chassis;
(b) a power unit on the chassis;
(c) a plurality of truck members one disposed at each end of each side of the chassis and each including a rigid elongated frame extending longitudinally of the chassis and mounting a wheel at the opposite longitudinal ends thereof;

(d) a continuous track member operatively engaging the wheels on each side of the chassis;
(e) a pair of upwardly converging radius arms secured pivotally to each side of the chassis and connected pivotally one to each frame coaxial with the outer wheel thereon;
(f) resilient cushion means interengaging the chassis and each frame intermediate the ends of the latter for supporting the chassis resiliently on the truck members;
(g) the radius arms being proportioned and arranged to dispose the ground engaging portion of each track member in a substantially flat plane throughout the distance between the outermost wheels on each side of the chassis;
(h) interengaging drive means on the rotational axis of one of the wheels and the chassis pivot axis of the associated radius arm; and
(i) drive connecting means coupling the power unit to said drive means at the chassis pivot axis.

References Cited in the file of this patent

UNITED STATES PATENTS 1,947,475   Knox et al. _____ Feb. 20, 1934

FOREIGN PATENTS 441,516   Italy _____ Nov. 5, 1948